US009533600B1

(12) United States Patent
Schwab et al.

(10) Patent No.: US 9,533,600 B1
(45) Date of Patent: Jan. 3, 2017

(54) STRUCTURALLY INTEGRATED PROPULSION BATTERY

(71) Applicant: GM Global Technology Operations LLC, Detroit, MI (US)

(72) Inventors: Leo F. Schwab, Fraser, MI (US); Tao Wang, Oakland Township, MI (US); Phillip D. Hamelin, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/844,498

(22) Filed: Sep. 3, 2015

(51) Int. Cl.
| *B60K 1/00* | (2006.01) |
| *B60L 11/18* | (2006.01) |
| *B60K 1/04* | (2006.01) |
| *H01M 2/10* | (2006.01) |
| *H01M 10/65* | (2014.01) |
| *H01M 10/052* | (2010.01) |

(52) U.S. Cl.
CPC ............ *B60L 11/1879* (2013.01); *B60K 1/04* (2013.01); *B60L 11/1874* (2013.01); *H01M 2/1083* (2013.01); *H01M 10/052* (2013.01); *H01M 10/65* (2015.04); *B60K 2001/0438* (2013.01); *H01M 2220/20* (2013.01)

(58) Field of Classification Search
CPC . H01M 10/65; B60L 11/1874; B60L 11/1877; B60L 11/1898; B60L 11/1879; B60K 1/00
See application file for complete search history.

(56) References Cited

U.S. PATENT DOCUMENTS

| 5,639,571 | A | * | 6/1997 | Waters | B60L 11/1874 |
| | | | | | 180/68.5 |
| 7,905,308 | B2 | * | 3/2011 | Abe | H01M 2/1077 |
| | | | | | 180/68.5 |
| 8,556,017 | B2 | * | 10/2013 | Kubota | B60K 1/04 |
| | | | | | 180/68.1 |
| 8,672,354 | B2 | * | 3/2014 | Kim | B60K 1/04 |
| | | | | | 180/68.5 |
| 8,739,910 | B2 | * | 6/2014 | Katayama | B62D 21/152 |
| | | | | | 180/311 |
| 8,783,402 | B2 | * | 7/2014 | Ogihara | B60L 11/1877 |
| | | | | | 180/68.5 |
| 8,939,246 | B2 | * | 1/2015 | Yamaguchi | B60K 1/04 |
| | | | | | 180/311 |
| 2012/0312614 | A1 | * | 12/2012 | Fujiwara | H01M 2/1077 |
| | | | | | 180/68.5 |
| 2014/0338999 | A1 | * | 11/2014 | Fujii | B60K 1/04 |
| | | | | | 180/68.5 |
| 2015/0180078 | A1 | * | 6/2015 | Ikeda | B60L 11/1898 |
| | | | | | 180/68.5 |
| 2015/0249240 | A1 | * | 9/2015 | Hihara | B60K 1/04 |
| | | | | | 180/68.5 |
| 2016/0068195 | A1 | * | 3/2016 | Hentrich | B60K 1/04 |
| | | | | | 180/68.5 |

* cited by examiner

*Primary Examiner* — Hau Phan (74) *Attorney, Agent, or Firm* — Quinn Law Group (57) ABSTRACT

A method and device for improving a structurally integrated propulsion battery system with a battery, a tray for accommodating the battery, with lower and upper internal structural cross beams coupled to the tray, and a liquid cooling plate located between the upper internal structural cross beam and the lower internal structural cross beam.

20 Claims, 10 Drawing Sheets

STRUCTURALLY INTEGRATED PROPULSION BATTERY

FIELD

This application relates generally to a structurally integrated vehicular propulsion battery system. More specifically, the application relates to methods and devices for enhancing structural performance for a vehicle and battery such that systems of low mass and cost can be provided such that occupants of vehicles have maximum comfort with a system allowing for an extended vehicle range.

BACKGROUND

Battery powered vehicles offer significant advantages over traditional modes of travel. However, multiple technological problems still need to be overcome so as to ensure optimal use of the technology. Current market products are limited, for example, by range of travel, and structural soundness. In one particular form, such products require multiple cooling plates with multiple hose connections that wind inefficiently over the structural beams. In such systems problems inevitably arise as a result of lower reliability due to the multiple hose connections and air getting trapped above structural beams during service repair. Trapped air can prevent proper coolant flow and fill volume thus affecting the system's ability to function properly.

There is a long felt need in the art for affordable electric vehicles with long ranges having structurally integrated batteries with systems providing structural enhancement. There is a long felt need in the art for enhanced methods, devices, and systems with single coolant plates capable of accommodating large quantities of active battery material so as to provide adequate power required for long-distance travel. Provided herein are descriptions of such methods devices, and systems, which achieve an optimized structural performance with low mass, cost, and efficient packaging so as to allow maximum occupant comfort and vehicle usage.

SUMMARY

Embodiments described herein provide for a structurally integrated propulsion battery system. The system in specific embodiments can include one or more of: a battery, a tray configured to accommodate at least one battery, a lower internal structural cross beam coupled to the tray, an upper internal structural cross beam coupled to the lower internal structural cross beam, and at least one liquid cooling plate located between the upper internal structural cross beam and the lower internal structural cross beam. In specific embodiments the tray spans the width of an average passenger car and the length of approximately the distance between the front and rear wheels. Other embodiments include batteries that are smaller fractions of this size.

Additional embodiments described herein provide for a structurally integrated propulsion battery system that can include at least one battery and/or a tray configured to accommodate at least one liquid cooling plate and the battery. The system can also include at least one lower internal structural cross beam coupled to the inside of the tray and/or at least one upper internal structural cross beam coupled to the at least one lower internal structural cross beam via at least one bolt. The coupling of the lower internal structural cross beam to the inside of the tray can include, for example, welding such as spot welding. Specific embodiments can also include a single or multiple liquid cooling plate located between the at least one upper structural cross beam and the at least one lower cross beam, the at least one bolt extending through the single liquid cooling plate and through the at least one lower structural cross beam. Yet additional embodiments include at least one bolt fastener coupled to the bottom end of the at least one bolt, the at least one bolt fastener located between the lower internal structural cross beam and the tray. Embodiments can include at least one internal cross beam saddle bracket coupled to the end of the at least one upper internal structural cross beam via the bolts and also coupled to the at least one lower internal structural cross beam where the at least one lower internal structural cross beam is aligned with a side of the tray. Embodiments can also include one or more of: at least one external side attachment coupled to the exterior of the tray, an external body assembly coupled to the exterior of the tray, the external body assembly comprising at least one external cross beam and at least one external longitudinal beam, the at least one external longitudinal beam aligned substantially with the longitudinal axis of the tray and the at least one external cross beam aligned substantially perpendicular thereto. In specific embodiments two or more of the at least one upper internal structural cross beam, the at least one lower internal structural cross beam, the at least one internal cross beam saddle bracket, the at least one external side attachment, and the at least one external cross beam are aligned so as to transfer side crash impact through the battery structure.

Specific embodiments described herein provide for a propulsion system for an electric vehicle. The system can have at least one battery and/or a tray configured to accommodate a single or multiple liquid cooling plate(s) and said battery (such as two plates, four plates, eight plates, or more). In specific embodiments there is at least one lower internal structural cross beam coupled to an inside of said tray and/or at least one upper internal structural cross beam coupled to said at least one lower internal structural cross beam via at least one linking mechanism. The single liquid cooling plate can be oriented between said at least one upper internal structural cross beam and said at least one lower internal structural cross beam. The linking mechanism can extend through said single liquid cooling plate and through the lower internal structural cross beam. In specific embodiments the propulsion system is used as part of a plug-in vehicle with battery power only, or as part of a plug-in vehicle with battery power and a second source of power.

Yet additional embodiments described herein provide for a method of forming a structurally integrated propulsion battery system. Embodiments of the method can include providing one or more batteries and a tray configured to accommodate a single liquid cooling plate and the battery. Embodiments of methods described herein can also include coupling one or more lower internal structural cross beam welded to the inside of the tray and/or coupling one or more upper internal structural cross beam to one or more of the lower internal structural cross beams via one or more linking mechanisms. In specific embodiments methods can include orienting a single liquid cooling plate between one or more of the upper internal structural cross beams and one or more of the lower internal structural cross beams and/or extending one or more of the linking mechanisms through the single cooling plate and through one or more of the lower internal structural cross beams.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

Specific embodiments of the present disclosure will now be described. The invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which embodiments of this invention belong. The terminology used herein is for describing particular embodiments only and is not intended to be limiting of the invention. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about," which is intended to mean up to ±10% of an indicated value. Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of embodiments of the invention are approximations, the numerical values set forth in the specific examples are reported as precisely as possible. Any numerical values, however, inherently contain certain errors necessarily resulting from error found in their respective measurements.

Parts of methods described herein such as mathematical determinations, calculations, inputting of data for computations or determinations of equations or parts thereof can be performed on parts of or one or more computers or computer systems that can include one or more processors, as well as software to run or execute programs and run calculations or computations.

Methods and systems and parts thereof described herein can be combined so as to implement embodiments of the invention. Forms of words used herein can have variations: for example when a word such as "couple" is used, this implies that variations such as "coupled to," and "coupling," and "coupling to" are understood to have been considered.

Figure 1:
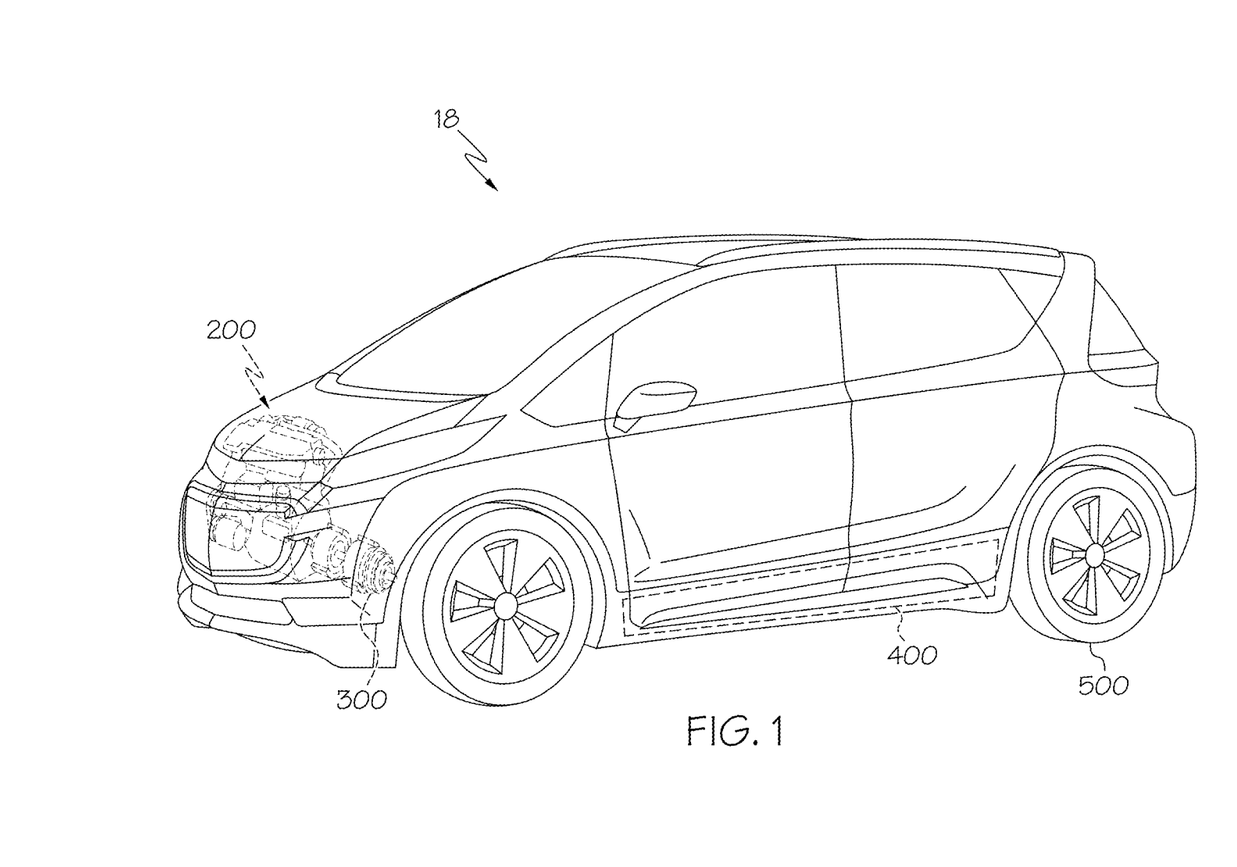
FIG. 1 is a schematic diagram of an exemplary vehicle which can be configured with a hybrid power source and integrated with a battery pack and various other subcomponents.

FIG. 1 is a schematic diagram of an exemplary vehicle 18 which can be configured with a hybrid power source and integrated with a battery pack and various other subcomponents. Within the present context, it will be appreciated that the term "vehicle" may apply to a car, truck, van, sport utility vehicle (SUV), or the like. Vehicle 18 can be all electric/battery powered, or can include other power-sources. Vehicle 18 can include one or more conventional internal combustion engines (ICEs, 200), one or more electric motors 300 and battery 400 as well as an electronic control system (not shown). Vehicle 18 can further include a powertrain (not shown, which could be in the form of a driveshaft or the like) to deliver propulsive power from the ICE 200, motor/generator 300 or battery 400 to one or more of the wheels 500. Battery 400 may additionally include a state of charge (SOC) system and power inverter assembly (neither of which are shown), the latter of which includes various modules and capacitors (not shown) as well as other conductive elements configured to provide a pathway for current flow between these and other associated battery-related electronic components. Busbar assemblies can provide compact, reliable electrical connection between the various cells within the battery 400. Battery 400 is illustrated in a formation of a flat pack. In specific embodiments the battery 400 is a battery module or modules, and/or a battery pack or packs, or the tray 4 surrounding the battery 400 (tray not shown in detail in FIG. 1) is configured substantially in a T-shape. In specific embodiments such a T-shape leads to difficulty in having a vehicle having a middle back seat with substantial floor space for a person's feet (As there is a raised portion in the case at that point). Therefore in some embodiments the battery 400 as a battery module or modules, and/or a battery pack or packs, or the tray 4 surrounding battery 400 has a smooth shape such that the top matches the interior shape of the vehicle, thereby allowing for the additional space at the floor in the back of the vehicle allowing comfortably for at least five passengers in the vehicle. Specific embodiments contemplated herein include a plug-in vehicle 18 with the batteries 400 that can be recharged from an external source of electricity, such as wall sockets, and the electricity stored in the batteries 400. Embodiments can include an extendable plug-in component for reaching such sockets from said vehicle. In specific embodiments of the plug-in vehicles, batteries 400 are the only source of power, and in other embodiments, the plug-in is a plug-in hybrid vehicle 18.

Figure 2:
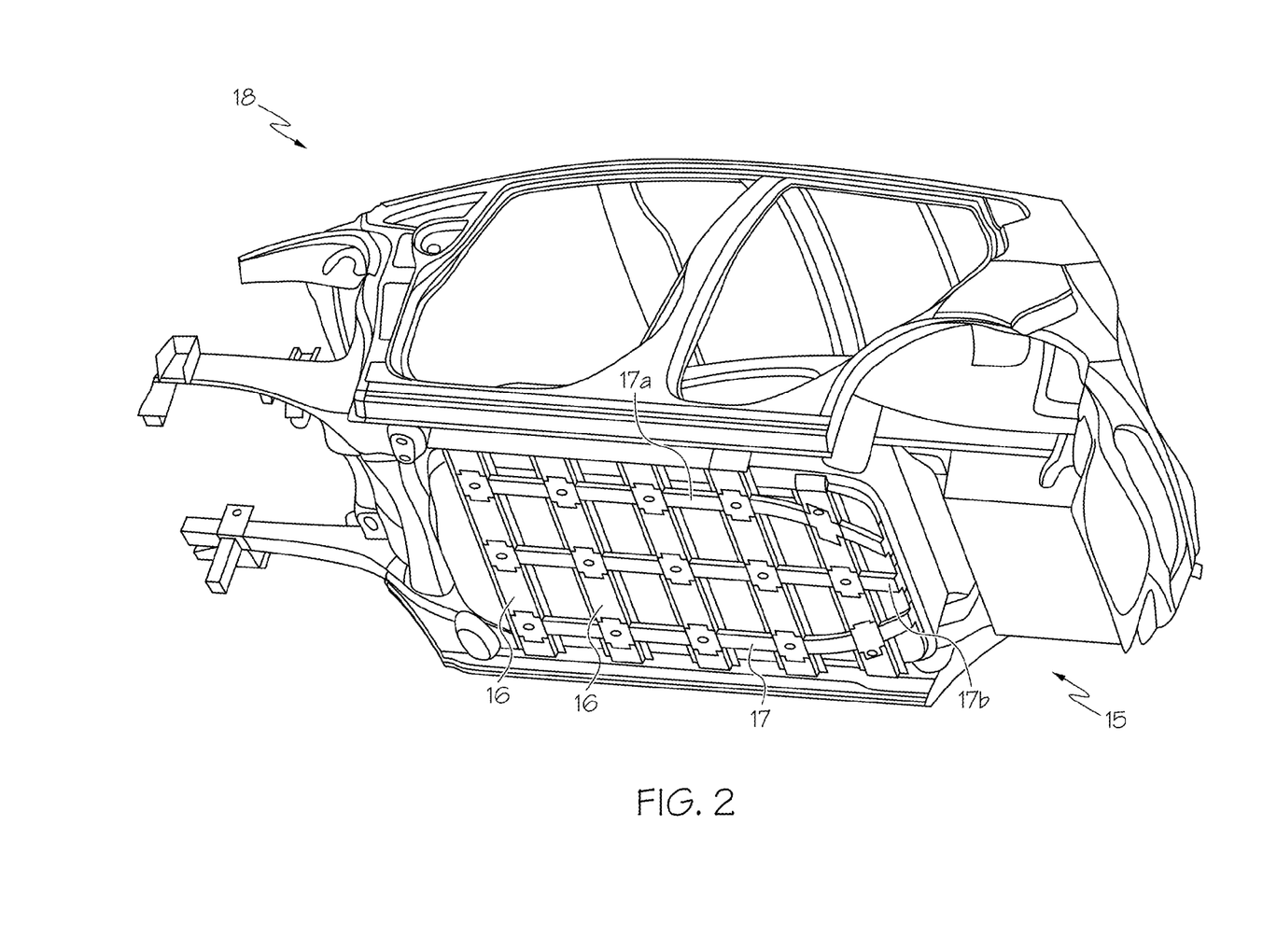
FIG. 2 illustrates a vehicle with an external body assembly with the attached battery pack.
Figure 4:
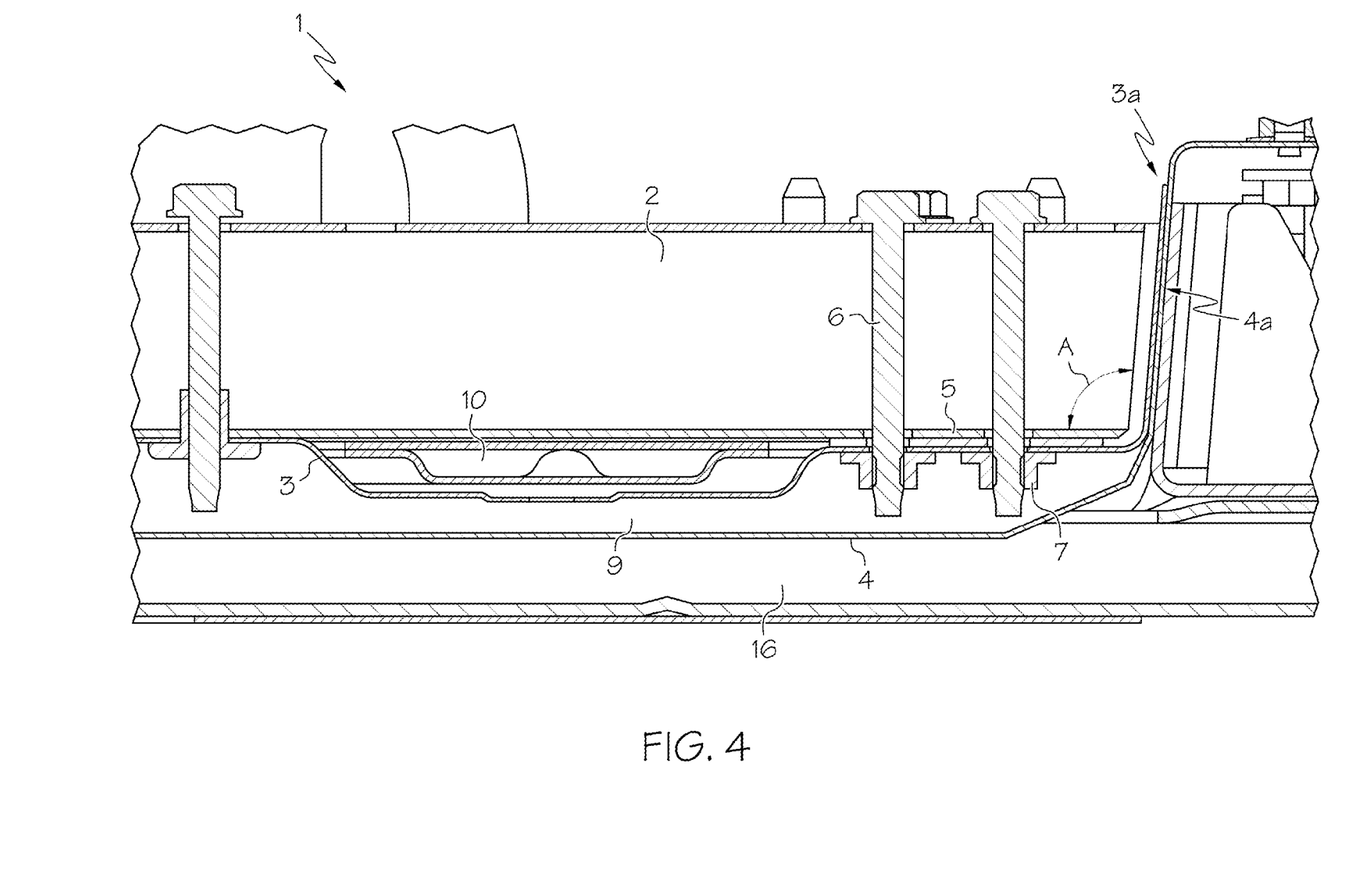
FIG. 4 illustrates a cross-sectional view of a structurally integrated propulsion battery system.

FIG. 2 illustrates a vehicle 18 with an external body assembly 15 with the attached battery pack (a non-limiting embodiment of the battery pack is shown by battery 400 in FIG. 1). Also illustrated are the external cross beams 16 and external longitudinal beams 17. The illustrated external longitudinal beams 17 include external longitudinal side beams 17a and an external longitudinal central beam 17b. The external longitudinal central beam 17b is generally linear and disposed between the external longitudinal side beams 17a. The external longitudinal side beams 17a each curve inward at one end toward the external longitudinal central beam 17b. The battery pack (and/or battery system) can be coupled to the bottom center of the vehicle 18, substantially in the center of the bottom of the vehicle 18 such that it extends substantially an entire width of the vehicle 18. The external body assembly 15 can be coupled to the exterior of the tray 4. One or more of the external longitudinal beams 17 can be aligned substantially with a longitudinal axis of the tray 4 (and the longitudinal axis of the external body assembly 15) and one or more of the external cross beams 16 can be aligned substantially perpendicular to the longitudinal axis of the tray 4. Devices and methods provided herein can further comprise aligning one or more of the upper internal structural cross beams 2, one or more of the lower internal structural cross beams 3, and/or one or more of the external cross beams 16 with each other so as to transfer side crash impact through the battery system 1 (FIG. 4). The battery pack can include at least three external longitudinal beams 17 comprising a linear central beam and one beam to each side of the linear central beam and running substantially in parallel therewith, each of said side beams curving inward at one end toward said linear central beam. In addition to adding stiffness to the battery pack, the longitudinal beams 17 also provide protection to the battery pack in case the vehicle 18 drives over an obstacle that would strike the battery pack. The curving section of the external longitudinal side beams 17*a* can be up to about forty percent of the length of each external longitudinal side beam 17*a*. The curving section of the external longitudinal side beams 17*a* can be about five percent, ten percent, fifteen percent, twenty percent, or from about five to about ten percent, or from about five to about twenty-five percent of the total length of the external longitudinal side beam 17*a*. In specific embodiments devices and methods have from about 1 to about 5 external cross beams 16 and/or about 1 to about 5 external longitudinal beams 17, or from about 2 to about 5 external longitudinal beams 17 (each linear or curved).

Figure 3:
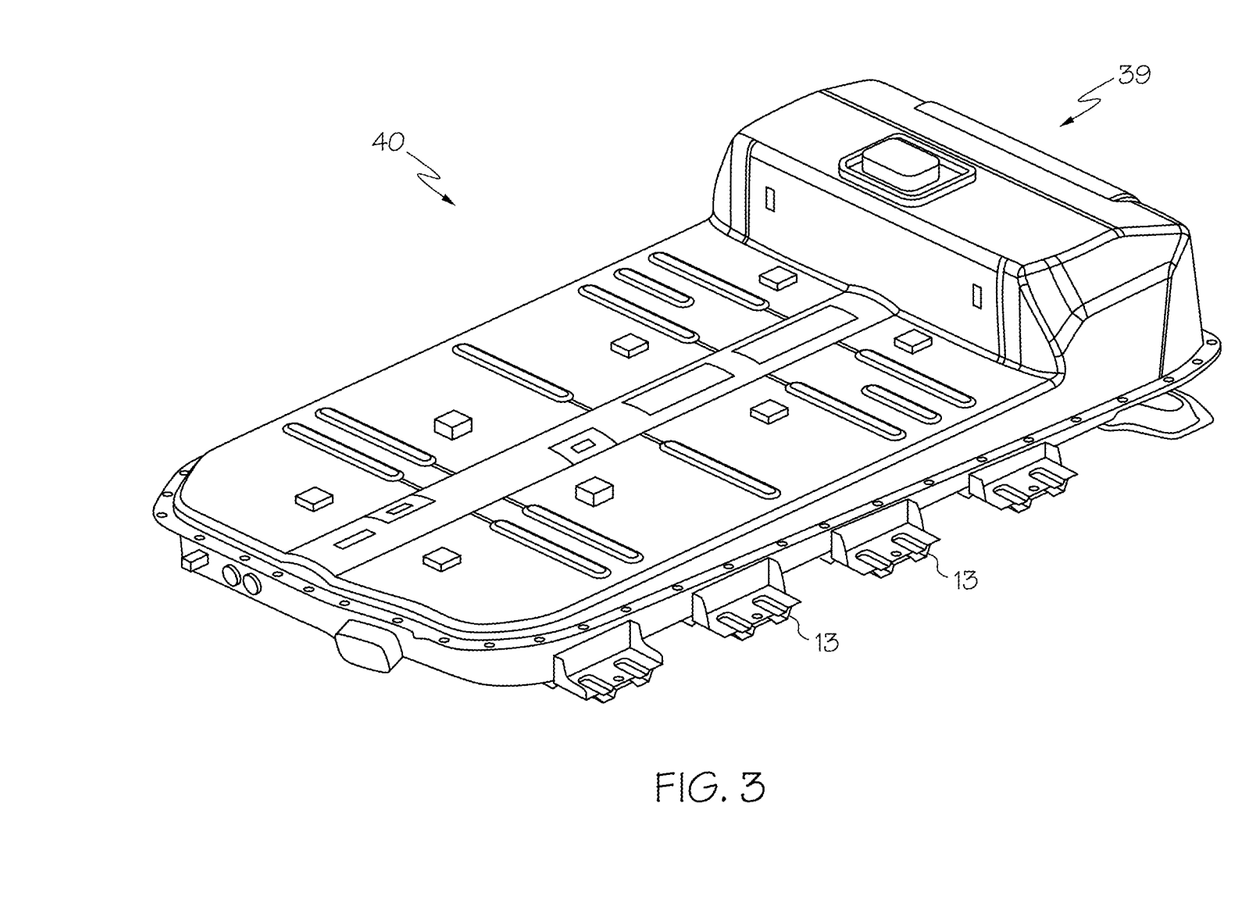
FIG. 3 illustrates a completed assembly of a structural Rechargeable Energy Storage System (RESS).

FIG. 3 illustrates a completed assembly 40 of a structural RESS. The assembly process for such is provided in FIG. 8. Also illustrated in FIG. 3 are the side brackets 13 and the external cover 39.

FIG. 4 illustrates a cross-sectional view of a structurally integrated propulsion battery system 1. Illustrated is an upper internal structural cross beam 2, a lower internal structural cross beam 3 including the upward slanting section 3*a* of the internal structural cross beam 3 that is in line with a tray 4, specifically at the tray side 4*a*. Also illustrated is the bottom surface of an internal bracket 5 as well as the linking mechanism 6, a fastener 7 for the linking mechanism 6, an external cross beam 16, and a gap 9 between the lower internal structural cross beam 3 and the tray 4. A liquid cooling plate 10 is illustrated between the upper internal structural cross beam 2 and the lower internal structural cross beam 3. In specific embodiments the internal bracket 5 is a saddle bracket. The linking mechanism 6 can rotate into the fastener 7 or be form fitted or pressed onto the fastener 7. The fastener 7 can have threads onto which the linking mechanism 6 rotates so as to cinch the fastener 7 against the underside of the lower internal structural cross beam 3. The fastener 7 can be a nut. The fastener 7 can have wings that extend out, pressing against an underside of the lower internal structural cross beam 3, therein providing additional support and stability to the system, and holding the upper internal structural cross beam 2 onto the internal bracket 5.

The upper internal structural cross beam 2 can be coupled to the lower internal structural cross beam 3 via a linking mechanism 6 that extends through each of the beams 2, 3 as well as the liquid cooling plate 10 that is located therebetween, the linking mechanism 6 extending between the lower internal structural cross beam 3 and the tray 4. The linking mechanism 6 can be bolts, screws, nails, pins, or other mechanism so as to bind aspects including the upper internal structural cross beam 2 and lower internal structural cross beam 3. The gap 9 between the lower internal structural cross beam 3 and the tray 4 can be used as a channel to route naturally occurring condensation to a depression on the forward part of the tray 4. One or more insulation pads (FIG. 8) can be placed/located under the liquid cooling plate 10. In specific embodiments there are only two hose connections associated with the liquid cooling plate 10 located on the forward portion of the battery 400. The upper internal structural cross beam 2 can be oriented at less than about three millimeters from a side of the tray 4. One or more ends of the upper internal structural cross beam 2 can be angled such that a top side length of the upper internal structural cross beam 2 is longer than a lower side length; in specific embodiments an angled side of the upper internal structural cross beam is substantially parallel with the upward slanting section 3*a* of the internal structural cross beam 3 and/or the tray side 4*a*, thus providing a more compact system able to be assembled with common manufacturing part variation to direct the force of side impact into a direction of the longitudinal axis of the upper internal structural cross beam 2, which provides additional strength and maintains integrity. In specific embodiments an angle A from the bottom to a side edge of the upper internal structural cross beam 2 is from about ninety to about one hundred degrees.

Figure 5:
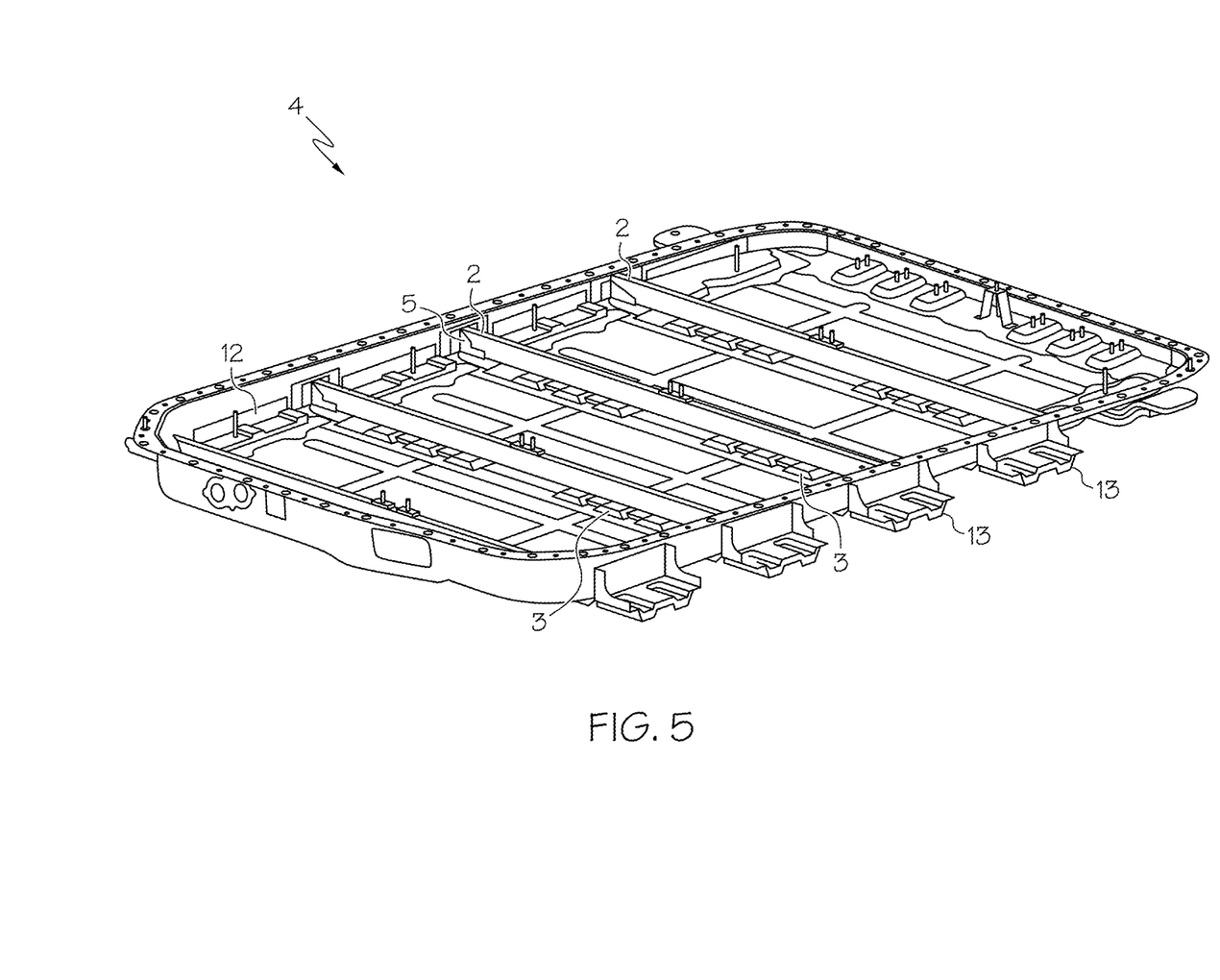
FIG. 5 illustrates a perspective view of the tray.

FIG. 5 illustrates a perspective view of the tray 4. Also illustrated are the upper internal structural cross beams 2, the lower internal structural cross beams 3, internal perimeter beams 12, and side brackets 13 coupled to an exterior side of the tray 4. The lower internal structural cross beam 3 can be coupled to the tray 4 via welding. The tray 4 can be impermeable to liquid. The side bracket 13 can be coupled to an external cross beam 16 (FIG. 2). The side bracket 13 can also coupled to the internal bracket 5 (such as a saddle bracket) oriented on the interior of the tray 4 that supports the upper internal structural cross beam 2. The internal perimeter beams 12 can be placed on each side of the tray 4, and can extend substantially the length of the tray 4, or each of the internal perimeter beams 12 can extend a distance between each upper internal structural cross beam 2. There can be from about one to about five internal perimeter beams 12 on each side of the tray 4, and such beams can provide structural support to the tray 4. The internal perimeter beam 12 can have a section that is raised away from the inside bottom of the tray 4, and can have a section that is raised away from an internal side of the tray 4.

The tray 4 can support a battery cell or cells, a battery module or modules, and/or a battery pack or packs. As used herein a battery module can comprise several battery cells (such as from about 1 to about 10 or about 1 to about 20) connected in either series or parallel. A battery pack can then be assembled by connecting modules together, again either in series or parallel. In specific embodiments 1, 2, 3, 4, 5, 6, 7, 8, 9, 10, or more battery modules can be coupled together. The tray 4 can be configured such that it accommodates enough active battery material (such as lithium) via at least one battery cell, module, or pack so as to provide a vehicle with a range of about two-hundred miles (or at least two-hundred miles) using only the at least one battery as a power source. For example, such a battery could have a capacity of 60 kwh of energy. In specific embodiments devices and methods described herein are used with vehicles that only have battery power. Specific embodiments as described herein involve vehicles that are not powered by gasoline, diesel, ethanol, biodiesel, propane, or compressed natural gas.

Figure 6:
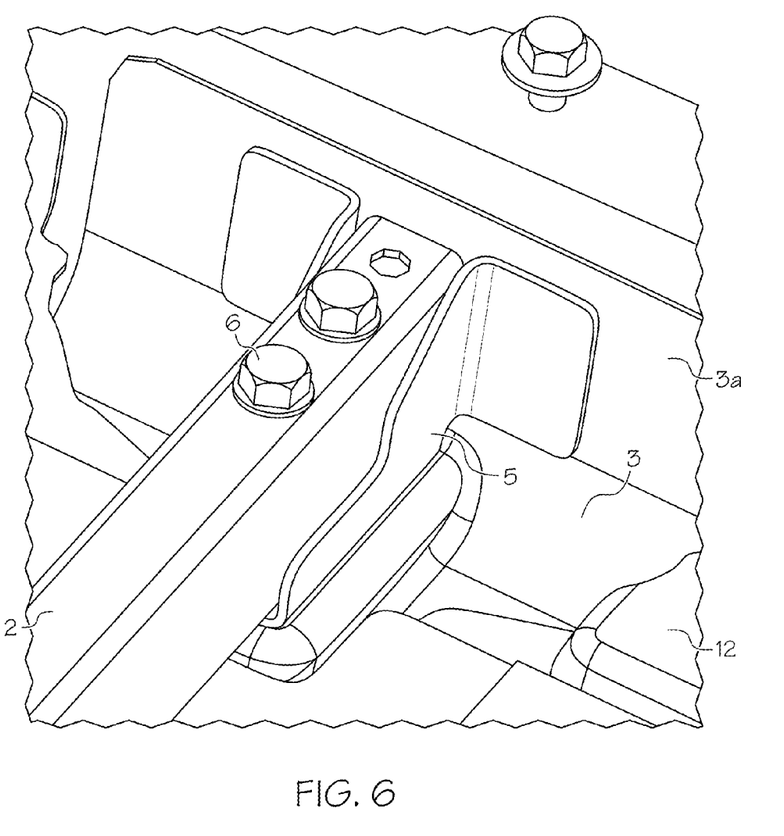
FIG. 6 illustrates a detail view of the internal bracket.

FIG. 6 illustrates a detail view of the internal bracket 5. Also illustrated are the upper internal structural cross beam 2, the lower internal structural cross beam 3 including the upward slanting section 3a of the lower internal structural cross beam 3, and the internal perimeter beam 12. The internal bracket 5 can be shaped such that it extends substantially the height of the upper internal structural cross beam 2, and extends under the upper internal structural cross beam 2 up to about ten percent of the length of the upper internal structural cross beam 2. One or more of the internal brackets 5 can be used, with an internal bracket 5 being placed/located on one or both sides of one or more upper internal structural cross beams 2. In specific embodiments the internal bracket 5 is about the height of the upper internal structural cross beam 2 at the very end of the upper internal structural cross beam 2, and the internal bracket 5 is angled downward such that about half of the internal bracket 5 has a height of less than one half the height of the upper internal structural cross beam 2, the height of the upper internal structural cross beam 2 referring to the height as oriented when linked into the internal bracket 5. The internal bracket 5 can be welded to the upward slanting section 3a of the lower internal structural cross beam 3, the internal bracket 5 having wings that extend laterally outward away from a longitudinal axis of the upper internal structural cross beam 2, oriented so as to provide additional support for side impact to the tray 4 and/or a vehicle 18 to which the tray 4 is coupled. Such an orientation can direct the force of side impact into a direction of the longitudinal axis of the upper internal structural cross beam 2, which provides additional strength and maintains integrity. An additional function of the internal bracket 5 is to transfer bending moments from the upper internal structural cross beam 2 and the internal structural cross beam 3 out to the side bracket 13 (FIG. 3) which is connected to the external body assembly 15 (FIG. 2). This moment transfer increases the vibration frequency of the battery assembly substantially thus allowing the reduction of metal thickness throughout the vehicle 18 and thus reducing the mass of the vehicle 18.

Figure 7:
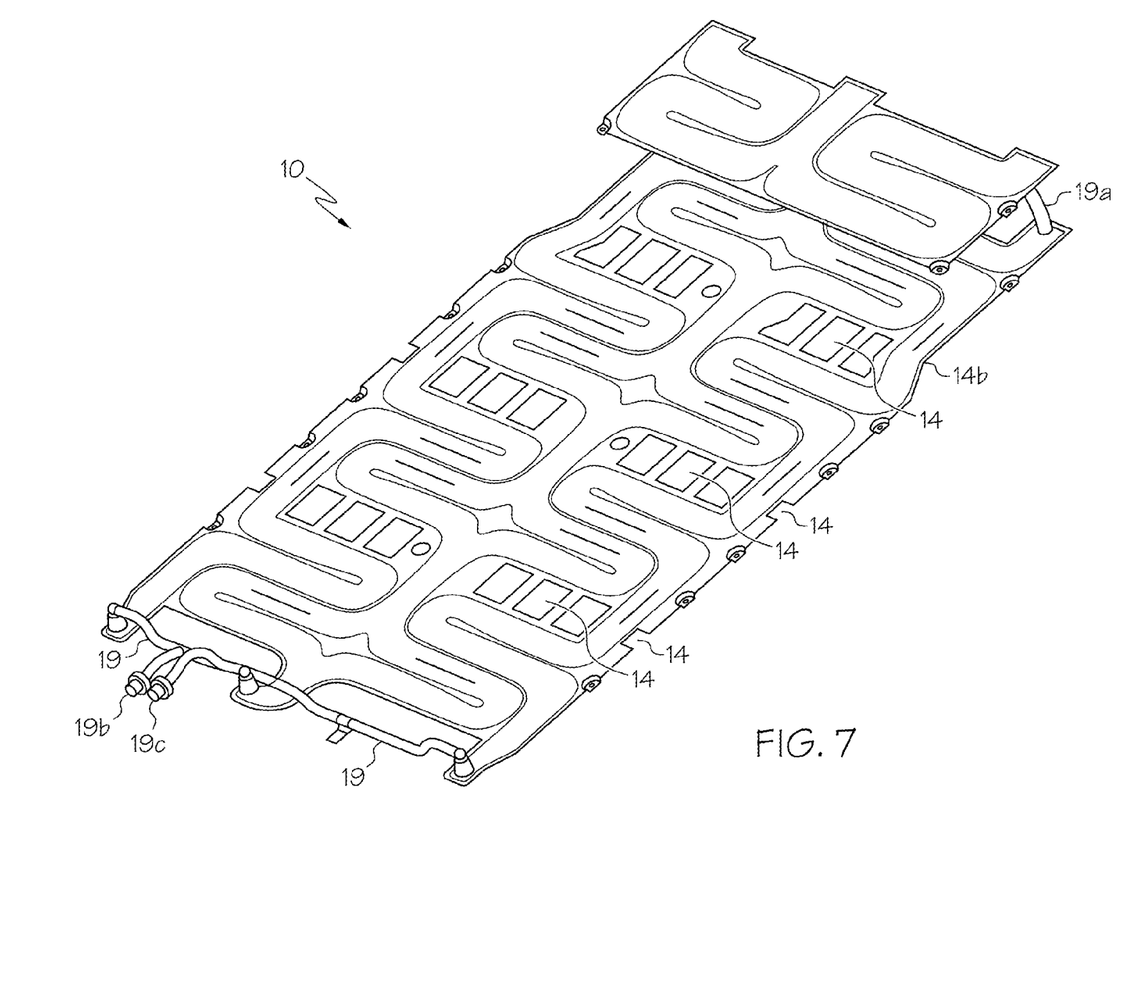
FIG. 7 illustrates the liquid cooling plate.

FIG. 7 illustrates the liquid cooling plate 10 illustrating openings 14 through which the linking mechanism 6 can extend. There can be one or more series of openings 14 grouped together, such as from about one to about three or about one to about five, and these series can be oriented such that there are about six series. There can be about one to about ten series. The series of openings 14 in specific embodiments are oriented such that there are, for example, three openings 14 on the left of a central longitudinal axis of the liquid cooling plate 10, and three openings 14 on the right. In a non-limiting example there are six series of three openings 14 per series, and the series are equally spaced such that there are three series on the left of the longitudinal axis of the liquid cooling plate 10, and three to the right. In specific embodiments series on either side of the longitudinal axis of the liquid cooling plate 10 can be oriented such that a substantially linear line oriented about ninety degrees to the longitudinal axis or the liquid cooling plate 10 can bisect all openings 14. In specific embodiments the openings 14 are notches at the edge of the liquid cooling plate 10. Part 14a designates a narrow section of the liquid cooling plate 10; this change in shape of the cooling plate can in specific embodiments allow (at the narrow point indicated by 14a or along the narrow section on one or both sides of the liquid cooling plate 10) for two or more bolts to pass through the saddle brackets. In specific embodiments two bolts extend through each upper internal structural cross beam 2 and through the liquid cooling plate 10 on one side of the longitudinal axis of the liquid cooling plate 10, and one bolt goes through the same upper internal structural cross beam 2 and the liquid cooling plate 10 on the opposing side of the longitudinal axis of the liquid cooling plate 10 (as shown in FIG. 4). Also illustrated in FIG. 7 are the coolant connection tubes 19 and 19a, which have the function of connecting the liquid cooling plates 10 to each other and to the inlet 19b and outlet 19c of the coolant connection tubes 19 of the battery pack.

Figure 8A:
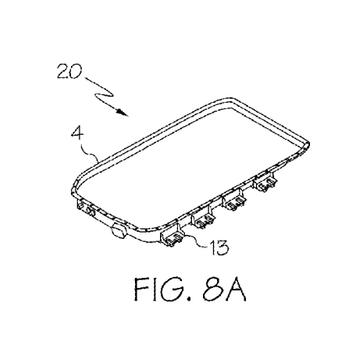
FIGS. 8A-8D illustrate a carrier assembly process.
Figure 8B:
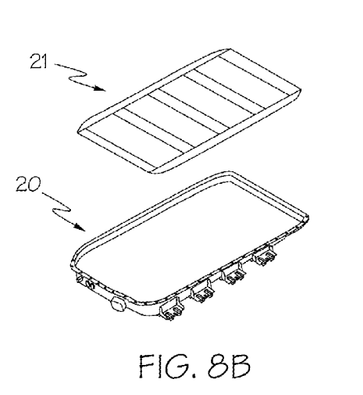
Figure 8C:
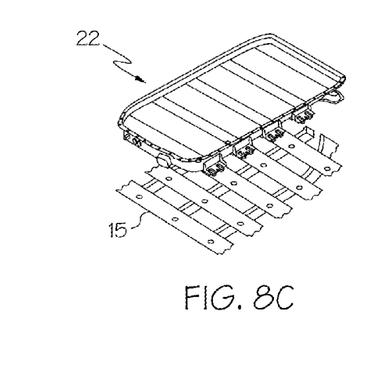
Figure 8D:
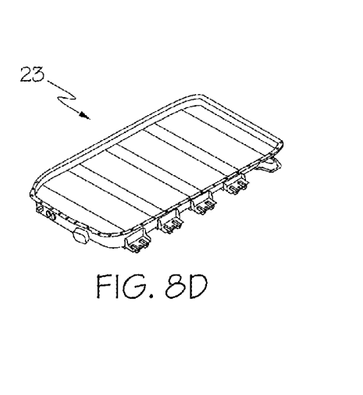
Figure 8E:
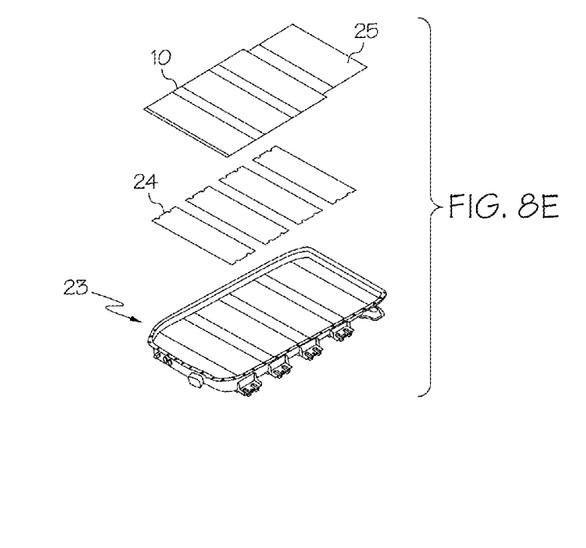
FIGS. 8E-8J illustrate the RESS assembly process.
Figure 8F:
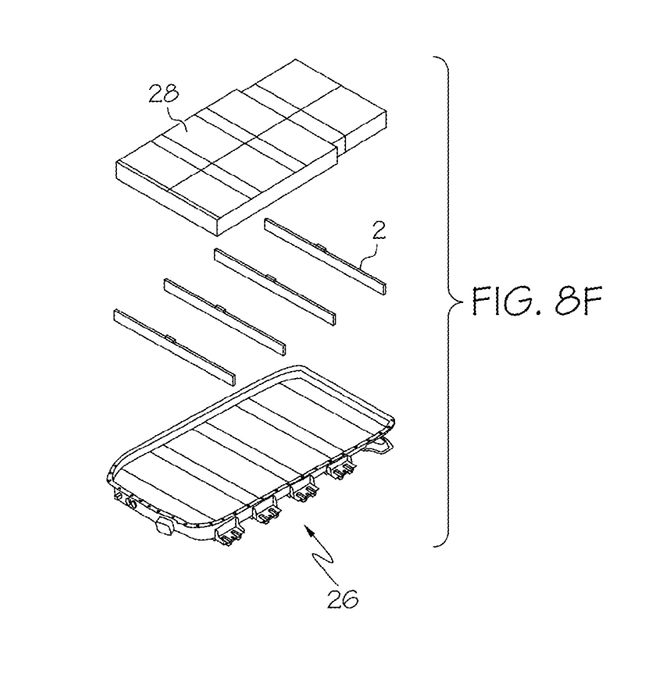
Figure 8G:
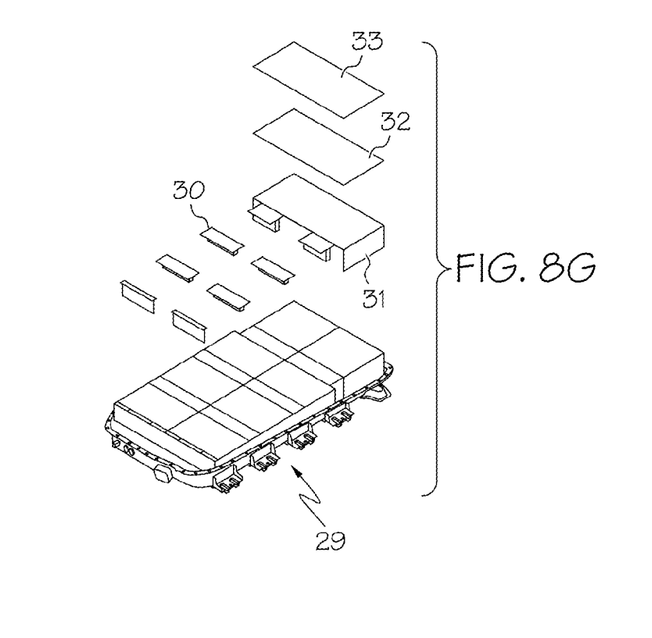
Figure 8H:
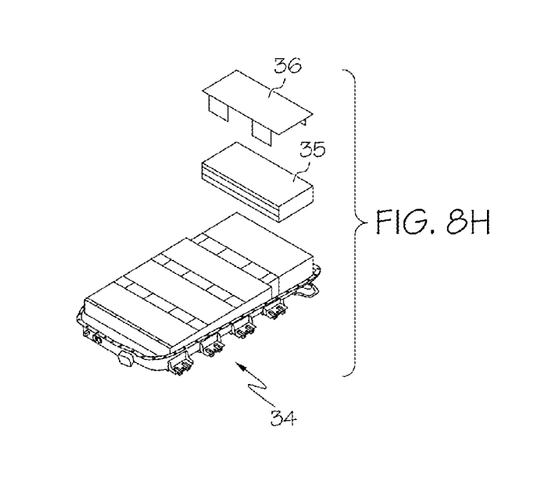
Figure 8I:
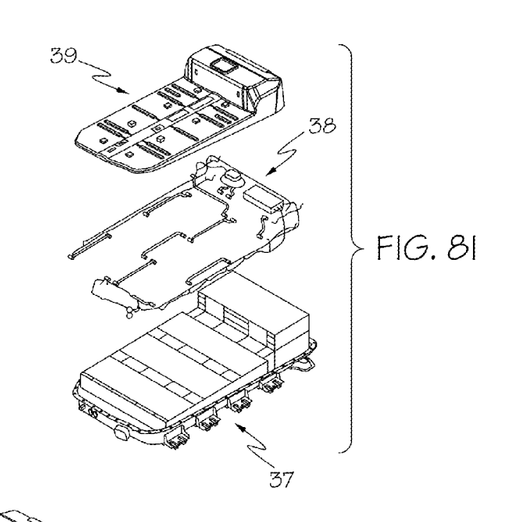
Figure 8J:
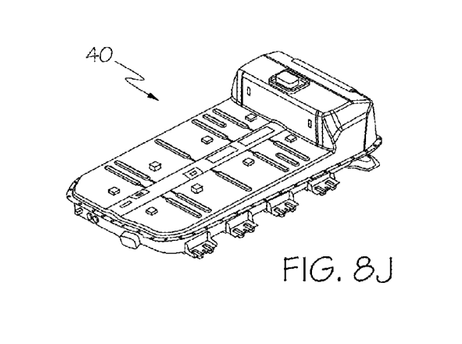

FIGS. 8A-8D illustrate an assembly process for a carrier assembly 23. FIGS. 8E-8J illustrate an assembly process for a completed assembly 40 of the structural RESS. FIG. 8A shows a tray 4 and a side bracket 13 that couple to form a tray assembly 20. In specific embodiments, the tray 4 and the side bracket 13 are welded together. FIG. 8B illustrates coupling the tray assembly 20 with an internal bracket assembly 21 to form a tray internal assembly 22 (shown in FIG. 8C). The tray internal assembly 22 can be coupled with the external body assembly 15 to form the carrier assembly 23 (shown in FIG. 8D). FIG. 8E illustrates coupling of the carrier assembly 23, insulation pads 24, liquid cooling plate 10, and thermal pad 25. FIG. 8E to FIG. 8I illustrate various, increasingly complete carrier assembly 23 stages (26, 29, 34, 37 and 40 for FIGS. 8E, 8F, 8G, 8H, and 8I, respectively). Specifically FIG. 8F illustrates the carrier assembly 23 with a large cooling plate 10 coupling with the upper internal structural cross beams 2 and the lower cell sections 28. FIG. 8G illustrates the coupling of the assembly 29 of FIG. 8F with the cell section hold down brackets 30 with the rear upper cell section support structure 31, the thermal pad 32, and the upper cooling plate 33. FIG. 8H illustrates the coupling of assembly 34 of FIG. 8G with the upper cell section 35 and the electronic support structure 36. FIG. 8I illustrates the coupling of assembly 37 of FIG. 8H with the electronics and wiring 38 and external cover 39. FIG. 8J illustrates the completed assembly 40 of the RESS.

Having described embodiments of the invention in detail, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery system, the battery system being structurally integrated and configured for propulsion, the battery system comprising:
   at least one battery;
   a tray configured to accommodate the at least one battery;
   a lower internal structural cross beam coupled to the tray;
   an upper internal structural cross beam coupled to the lower internal structural cross beam; and
   a liquid cooling plate located between the upper internal structural cross beam and the lower internal structural cross beam.

2. The battery system of claim 1, wherein the upper internal structural cross beam is coupled to the lower internal structural cross beam via a linking mechanism that extends through each of the lower internal structural cross beam and the upper internal structural cross beam as well as the liquid cooling plate that is located therebetween, the linking mechanism extending between the lower internal structural cross beam and the tray.

3. The battery system of claim 2, wherein the lower internal structural cross beam is coupled to the tray via welding.

4. The battery system of claim 3, wherein the tray is impermeable to liquid.

5. The battery system of claim 3, wherein the tray is configured to accommodate enough active lithium material via the at least one battery so as to provide a vehicle with a range of at least about two-hundred miles using only the at least one battery as a power source.

6. The battery system of claim 1, wherein the battery system is located substantially in a center of a bottom of a vehicle such that it extends substantially an entire width of the vehicle.

7. The battery system of claim 1, wherein each end of the upper internal structural cross beam is oriented at less than about three millimeters from a side of the tray.

8. The battery system of claim 1, further comprising an external body assembly coupled to an exterior of the tray, the external body assembly comprising at least one external cross beam and at least one external longitudinal beam, the at least one external longitudinal beam aligned substantially with a longitudinal axis of the tray and the at least one external cross beam aligned substantially perpendicular thereto.

9. The battery system of claim 8, further comprising a side bracket coupled to a side of the exterior of the tray and coupled to the at least one external cross beam, the side bracket also coupled to a saddle bracket oriented on an interior of the tray that supports the upper internal structural cross beam.

10. A structurally integrated propulsion battery system comprising:
    at least one battery;
    a tray configured to accommodate at least one liquid cooling plate and the battery;
    at least one lower internal structural cross beam welded to an inside of the tray;
    at least one upper internal structural cross beam coupled to the at least one lower internal structural cross beam via at least one bolt, the at least one liquid cooling plate located between the at least one upper internal structural cross beam and the at least one lower internal structural cross beam, the at least one bolt extending through the at least one liquid cooling plate and through the at least one lower internal structural cross beam;
    at least one bolt fastener coupled to a bottom end of the at least one bolt, the at least one bolt fastener located between the lower internal structural cross beam and the tray;
    at least one internal structural cross beam saddle bracket coupled to an end of the at least one upper internal structural cross beam via the at least one bolt and also coupled to the at least one lower internal structural cross beam where the at least one lower internal structural cross beam is aligned with a side of the tray;
    at least one external side attachment coupled to an exterior of the tray;
    an external body assembly coupled to the exterior of the tray, the external body assembly comprising at least one external structural cross beam and at least one external longitudinal beam, the at least one external longitudinal beam aligned substantially with a longitudinal axis of the tray and the at least one external structural cross beam aligned substantially perpendicular thereto; and
    wherein the at least one upper internal structural cross beam, the at least one lower internal structural cross beam, the at least one internal structural cross beam saddle bracket, the at least one external side attachment, and the at least one external structural cross beam are aligned so as to transfer side crash impact through a battery structure.

11. The battery system of claim 10, wherein the at least one battery is at least one of a battery module or a battery pack.

12. The battery system of claim 10, wherein the at least one external longitudinal beam comprises at least three external longitudinal beams comprising a linear external longitudinal central beam and one external longitudinal side beam to each side of the linear external longitudinal central beam and running substantially parallel therewith, each of the external longitudinal side beams curving inward at one end toward the linear external longitudinal central beam.

13. The battery system of claim 10, wherein the at least one external structural cross beam comprises from about 1 to about 5 external structural cross beams, and the at least one external longitudinal beam comprises from about 1 to about 5 external longitudinal beams.

14. A propulsion system for an electric vehicle, the propulsion system comprising:
    at least one battery;
    a tray configured to accommodate at least one liquid cooling plate and the battery;
    at least one lower internal structural cross beam coupled to an inside of the tray;
    at least one upper internal structural cross beam coupled to the at least one lower internal structural cross beam via at least one linking mechanism;
    the at least one liquid cooling plate being oriented between the at least one upper internal structural cross beam and the at least one lower internal structural cross beam; and
    the at least one linking mechanism extending through the at least one liquid cooling plate and through the at least one lower internal structural cross beam.

15. The propulsion system of claim 14, wherein the at least one linking mechanism comprises bolts that extend through each of the at least one upper internal structural cross beam and the at least one lower internal structural cross beam as well as the at least one liquid cooling plate that is located therebetween, the bolts extending between the at least one lower internal structural cross beam and the tray.

16. The propulsion system of claim 14, further comprising the propulsion system coupled to a bottom of the electric vehicle, the propulsion system placed substantially in a center of the bottom such that it extends substantially an entire width of the electric vehicle.

17. The propulsion system of claim 14, wherein the tray is configured to accommodate enough active lithium material via the at least one battery to provide the electric vehicle with a range of at least about two-hundred miles using only the at least one battery as a power source.

18. The propulsion system of claim 14, further comprising an external body assembly coupled to an exterior of the tray, the external body assembly comprising an external structural cross beam and an external longitudinal beam, the external longitudinal beam aligned substantially with a longitudinal axis of the tray and the external structural cross beam aligned substantially perpendicular thereto.

19. The propulsion system of claim 14, further comprising the upper internal structural cross beam, the at least one lower internal structural cross beam, and at least one external structural cross beam aligned so as to transfer side impact through the propulsion system.

20. The propulsion system of claim 14, further comprising the upper internal structural cross beam oriented at less than about three millimeters from a side of the tray.

* * * * *